(12) United States Patent
Mellina

(10) Patent No.: US 7,660,762 B1
(45) Date of Patent: Feb. 9, 2010

(54) METHOD AND SYSTEM FOR EFFICIENTLY MATCHING LONG AND SHORT POSITIONS IN SECURITIES TRADING AND TRANSACTING A SERIES OF OVERNIGHT TRADES FOR BALANCE SHEET NETTING

(75) Inventor: Thomas K. Mellina, Hoboken, NJ (US)

(73) Assignee: Citigroup Global Markets, Inc., New York, NY (US)

( * ) Notice: Subject to any disclaimer, the term of this patent is extended or adjusted under 35 U.S.C. 154(b) by 285 days.

(21) Appl. No.: 11/520,691

(22) Filed: Sep. 14, 2006

Related U.S. Application Data

(62) Division of application No. 10/813,521, filed on Mar. 29, 2004, now abandoned.

(60) Provisional application No. 60/457,929, filed on Mar. 28, 2003.

(51) Int. Cl.
*G06Q 40/00* (2006.01)

(52) U.S. Cl. .......................................... 705/37; 705/38
(58) Field of Classification Search .............. 705/37–38
See application file for complete search history.

(56) References Cited

U.S. PATENT DOCUMENTS

| | | | |
|---|---|---|---|
| 4,674,044 A | 6/1987 | Kalmus et al. ................. | 705/37 |
| 4,751,640 A | 6/1988 | Lucas et al. ................. | 705/36 R |
| 4,903,201 A | 2/1990 | Wagner ........................ | 705/37 |
| 5,077,665 A | 12/1991 | Silverman et al. ............. | 705/37 |
| 5,101,353 A | 3/1992 | Lupien et al. ................. | 705/37 |

(Continued)

FOREIGN PATENT DOCUMENTS

EP  0 399 850  11/1990

(Continued)

OTHER PUBLICATIONS

Governmental Securities Clearing Corporation web pages, retrieved from the Internet on Apr. 30, 2002 at URLs: http://www.gscc.com/about_gscc.html; http://www.gscc.com/about_gscc_navigation.html; http://www.gscc.com/gscc_logo.html; http://www.gscc.com/services.html; http://www.gscc.com/services_navigation.html; http://www.gscc.com/services_for_repurchase_agreements.html; http://www.gscc.com/netting_and_settlement.html; http://www.gscc.com/trade_comparison.html.

(Continued)

*Primary Examiner*—Thu Thao Havan
(74) *Attorney, Agent, or Firm*—King & Spalding LLP

(57) ABSTRACT

A method and system for trading long and short inventory positions in securities for participants involves systematically obtaining long and short position information from each participant, processing the information in accordance with participant-controlled parameters, matching the participants' short positions to other participants' long positions and feeding the resultant activity back to each participant in the form of system-generated repo and reverse repo trades, while maintaining the anonymity of the participants. Another aspect enables trading baskets of serial overnight trades, each of which is treated as an independent overnight repo/reverse trade for financial reporting purposes, with corresponding notional amount, that involves, for example, cancellation of a basket trade and creating in its place a series of overnight trades corresponding to the basket trade.

60 Claims, 6 Drawing Sheets

U.S. PATENT DOCUMENTS

| | | | |
|---|---|---|---|
| 5,136,501 A | 8/1992 | Silverman et al. | 705/37 |
| 5,508,913 A | 4/1996 | Yamamoto et al. | 705/37 |
| 5,563,783 A | 10/1996 | Stolfo et al. | 705/8 |
| 5,692,233 A | 11/1997 | Garman | 705/36 R |
| 5,727,165 A | 3/1998 | Ordish et al. | 705/37 |
| 5,884,286 A | 3/1999 | Daughtery, III | 705/36 R |
| 5,905,974 A | 5/1999 | Fraser et al. | 705/36 R |
| 5,924,082 A | 7/1999 | Silverman et al. | 705/37 |
| 5,950,176 A | 9/1999 | Keiser et al. | 705/36 R |
| 5,970,479 A | 10/1999 | Shepherd | 705/37 |
| 6,014,643 A | 1/2000 | Minton | 705/36 R |
| 6,016,482 A | 1/2000 | Molinari et al. | 705/35 |
| 6,016,483 A | 1/2000 | Rickard et al. | 705/36 R |
| 6,029,146 A | 2/2000 | Hawkins et al. | 705/35 |
| 6,061,662 A | 5/2000 | Makivic | 705/36 R |
| 6,076,074 A | 6/2000 | Cotton et al. | 705/40 |
| 6,112,189 A | 8/2000 | Rickard et al. | 705/36 R |
| 6,131,087 A * | 10/2000 | Luke et al. | 705/26 |
| 6,134,536 A | 10/2000 | Shepherd | 705/37 |
| 6,148,293 A | 11/2000 | King | 705/35 |
| 6,157,918 A | 12/2000 | Shepherd | 705/36 R |
| 6,173,272 B1 | 1/2001 | Thomas et al. | 705/42 |
| 6,233,566 B1 | 5/2001 | Levine et al. | 705/36 R |
| 6,247,000 B1 * | 6/2001 | Hawkins et al. | 705/37 |
| 6,263,321 B1 | 7/2001 | Daughtery, III | 705/36 R |
| 6,343,277 B1 | 1/2002 | Gaus et al. | 705/37 |
| 6,393,409 B2 | 5/2002 | Young et al. | 705/37 |

FOREIGN PATENT DOCUMENTS

| | | |
|---|---|---|
| EP | 0 434 224 | 6/1991 |
| WO | WO 90/10910 | 9/1990 |
| WO | WO 97/08640 | 3/1997 |
| WO | WO 99/19821 | 4/1999 |
| WO | WO 01/52150 | 7/2001 |
| WO | WO 01/61602 | 8/2001 |
| WO | WO 01/80131 | 10/2001 |
| WO | WO 01/84450 | 11/2001 |
| WO | WO 02/47314 | 6/2002 |

OTHER PUBLICATIONS

Hakimattar, L., A New Breed of E-Commerce Engine Drives Profits—For Technology to Be Valuable to HPI Players, It Must Give Them the Tools to Make and Execute the Right Decisions, Rather Than Provide a Faster Means for Making the Wrong Ones (E-Business), Hydrocarbon Processing, vol. 80, No. 12, pp. 64(4), Dec. 2001.

Flood, Mark, Microstructure Theory and the Foreign Exchange Market, Federal Reserve Bank of St. Louis Review, vol. 73, No. 6, pp. 52(19), Nov.-Dec. 1991.

Hallford, Joshua, CBB Systems to Go Live Over Cantor's Objections, Securities Industry News. vol. 10, No. 29, p. 1, Jul. 27, 1998.

Sandman, John, Experts See Bigger Role for Repos in Electronic Trading, Securities Industry News, Jan. 15, 2001.

Web page entitled "Overview," retrieved from the Internet at URL http:/www.tradeweb.com/AboutTradeWeb/Introduction.htm on Apr. 23, 2001.

BrokerTec Global, LLC web pages, retrieved from the Internet on Apr. 24, 2001 at URLs: http://www.btec.com/newsite/AboutBtec/AboutBtec.cfm http://www.btec.com/newsite/AboutBtec/TradingBenefits.cfm http://www.btec.com/newsite/AboutBtec/SecuritiesTraded.cfm.

Cantor Exchange web pages, retrieved from the Internet on Apr. 24, 2001 at URLs: http://cx.cantor.com/htdocs/main/topnav.html http://cx.cantor.com/htdocs/main/main.html http://cx.cantor.com/htdocs/facts/factsmain.html http://cx.cantor.com/htdocs/facts/advantagemain.html http://cx.cantor.com.facts.newmain.html.

* cited by examiner

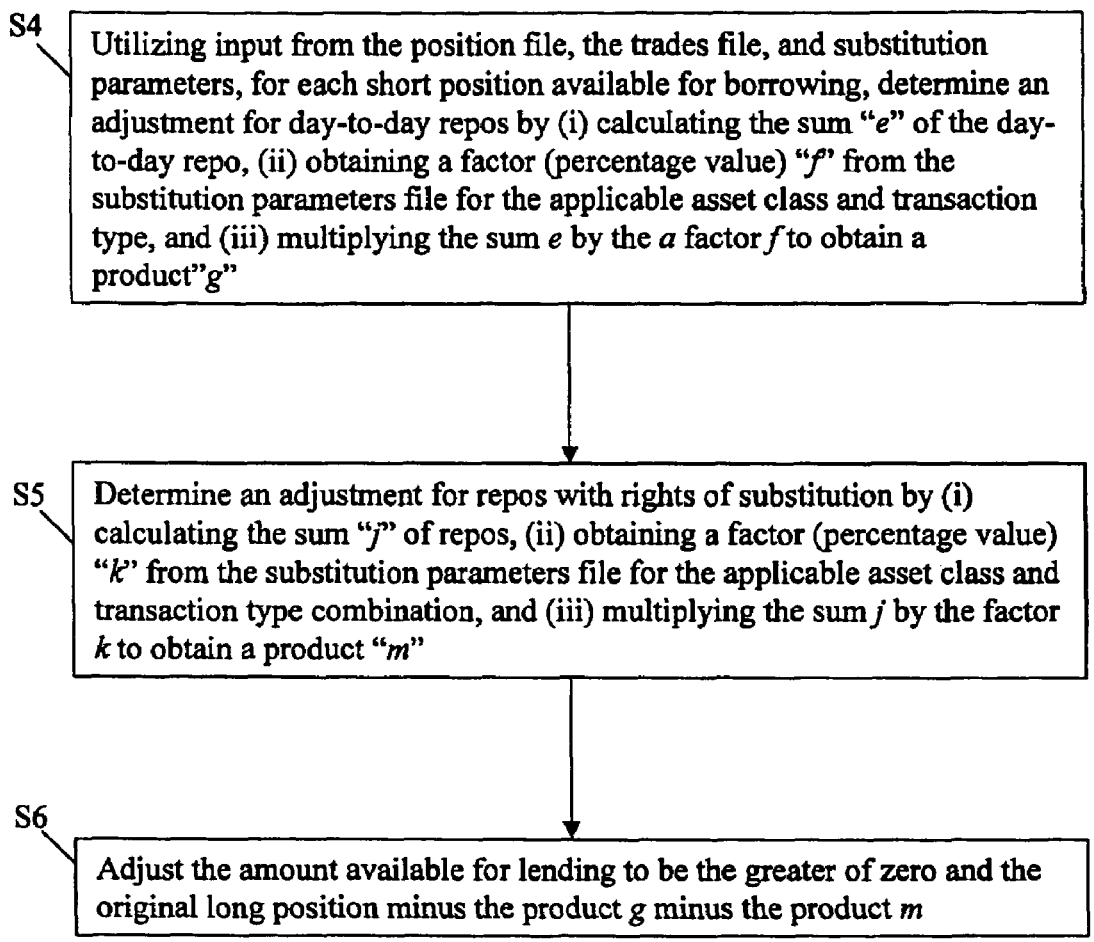

S4 Utilizing input from the position file, the trades file, and substitution parameters, for each short position available for borrowing, determine an adjustment for day-to-day repos by (i) calculating the sum "$e$" of the day-to-day repo, (ii) obtaining a factor (percentage value) "$f$" from the substitution parameters file for the applicable asset class and transaction type, and (iii) multiplying the sum $e$ by the $a$ factor $f$ to obtain a product "$g$"

S5 Determine an adjustment for repos with rights of substitution by (i) calculating the sum "$j$" of repos, (ii) obtaining a factor (percentage value) "$k$" from the substitution parameters file for the applicable asset class and transaction type combination, and (iii) multiplying the sum $j$ by the factor $k$ to obtain a product "$m$"

S6 Adjust the amount available for lending to be the greater of zero and the original long position minus the product $g$ minus the product $m$

FIG. 3

METHOD AND SYSTEM FOR EFFICIENTLY MATCHING LONG AND SHORT POSITIONS IN SECURITIES TRADING AND TRANSACTING A SERIES OF OVERNIGHT TRADES FOR BALANCE SHEET NETTING

PRIORITY APPLICATION

This application is a divisional of and claims priority to U.S. patent application Ser. No. 10/813,521, filed Mar. 29, 2004 now abandoned, which claims the priority to U.S. Provisional Patent Application Ser. No. 60/457,929, filed Mar. 28, 2003, which are hereby incorporated by reference in their entirety.

FIELD OF THE INVENTION

The present invention relates to the field of secured financing. More particularly, the present invention relates to a method and system, having a web-based portal or other user interface access, for matching long and short positions in securities trading to optimize capital, reduce costs, and expand risk management capabilities among trading entities that actively transact in the short-term financing markets.

DEFINITIONS

Bp(s) means basis point(s); there are 100 basis point in one percent; thus, an interest rate of, for example, 1.25% can be represented as 125 basis points.

CUSIP number is a nine-character number that uniquely identifies a particular security. CUSIP is an acronym for the Committee on Uniform Securities and Identification Procedures, the standards body which created and maintains the classification system. Foreign securities have a similar number, called the CINS number.

FIN 41 is a rule promulgated by the Financial Accounting Standards Board (FASB) that allows term repo and reverse repo trades with the same counterparty, the same maturity or end date, and the same clearing location to be netted off a trader's balance sheet.

FTP means File Transfer Protocol, a communication protocol used to transfer files through a TCP/IP network.

GC means general collateral

GSCC means Government Securities Clearing Corporation, a registered clearing corporation affiliated with the National Securities Clearing Corporation, with the primary purpose of ensuring orderly clearance and settlement in the U.S. government securities marketplace.

Off-side transaction or end-leg is the second or terminating side of a repo/reverse repo trade.

On-side transaction or start-leg is the first or beginning side of a repo/reverse repo trade.

Open repo or day-to-day repo is a repo which can be terminated by either party at any time, and which has an unspecified repurchase date.

Overnight repo is a repo with a term of one day.

Term repo is a repo with a term of more than one day.

Repo is a repurchase agreement; a contract in which the seller of securities, such as treasury bills, agrees to buy them back at a specified time for money equal to the original sale price plus financing interest.

Reverse repo is a reverse repurchase agreement; a purchase of securities with an agreement to resell them for money equal to the original purchase price plus financing interest at a specified future date.

SEC is the Securities Exchange Commission.

Settlement date is the purchase date of collateral.

BACKGROUND

At present, securities broker dealers in securities markets can cover their short positions by borrowing securities: from security lenders who often warehouse securities on behalf of the lenders' customers, directly from customers to obtain the securities, or from other broker dealers. However, it is not advantageous for broker dealers to borrow securities directly from other broker dealers because that will expose their identity and their current positions in certain securities. With such knowledge, competitors can corner the securities market on the exposed broker dealers and charge exorbitant rates for securities lending.

Another technique for broker dealers to cover their short positions is to go through an inter-dealer broker who is a registered broker with the SEC and provides a centralized means for traders, such as Salomon Smith Barney, to put up offers and bids for different types of collateral, such as securities. Those offers and bids are then shown to the entire trading market while keeping those traders making the offers and bids anonymous. This technique minimizes the exposure of broker dealers in borrowing and lending securities to others, including potential competitors.

Nevertheless, broker-dealer and client-related functions in the securities trading industry for all of the aforementioned techniques conventionally require a significant amount of dedicated resources in the front, mid and back office support areas of many financing desks. Additionally, because most of trading activities are commonly executed through inter-dealer brokers and securities lenders, additional costs to trading entities are needed for fees and margin costs on trading transactions.

SUMMARY OF THE INVENTION

There exists a need for diversified financing products in the securities markets, such as the short-term interest rate market, that enable financial market participants to significantly reduce the financing and operational costs associated with transacting in the repo markets, while improving risk management and reporting capabilities. Hence, the present invention provides a series of diversity financing products to the financial services industry. These products include systems and methods for providing market efficiencies by applying technology to a series of applications for automating broker-dealer and client-related functions in securities trading that currently require a significant amount of dedicated resources, in the front, mid and back office support areas of many financing desks.

The financing products of the present invention include aspects referred to herein as "Position Billboard." An objective of the Position Billboard aspect is to provide participating trading members in securities trading with a centralized mechanism to pool their securities positions for the purpose of covering short positions and generating the appropriate finance transactions to support those coverings. Finance trades generated by the Position Billboard matching process may be done on an overnight basis at an agreed upon overnight financing rate. The benefits include providing participating trading members with a more efficient and cheaper market for short term financing.

Traders such as broker-dealers are under constant balance sheet pressure and need to price competitively, especially as markets mature. Consequently, spreads narrow and clients demand larger balance sheet allocations. The Position Billboard aspects of the present invention can increase market efficiencies and reduce costs associated with providing this leverage to their clients.

Features and advantages of the Position Billboard aspect of an embodiment of the present invention include, for example: running a batch system that completes a cycle of matching/trading long and short positions prior to "start of business" each day or each business time frame; logic and process flow for substitutions that take into account other existing repo and reverse-repo agreements that the system user may have with both members and non-members of the Position Billboard aspect; pro rata allocation methodology wherein the total long positions from all trading members are matched against the total short positions from all trading members on a pro rata basis so that all parties involved in the trading/matching are treated equally; and if the Position Billboard aspect acts as agent for executions, no inquiry capability is allowed to identify parties involved in trading. Additional features and advantages of the Position Billboard aspect include, for example: the Position Billboard aspect acting as principal for executions; expansion of security restriction criteria to include restrictions on trading based on percentage and quantity limits of CUSIP and/or asset class; expansion of counterparty restriction criteria to include restrictions based on trading with a particular counterparty on quantity limits; submission of the transactions for GSCC novation for cost saving in fees and wire charges, as well as increase balance sheet netting opportunities; and minimum trade sizes for both repo and reverse repo transactions to reduce costs.

Additionally, preferred embodiments of the present invention provide a series of diversified financial services, including: trade matching, as-agent trade execution with anonymity of principal counterparties, as-principal trade execution, clearance and settlement interfaces, omnibus clearing, books and records postings, and transaction audit trail/reconciliation reporting.

To achieve the stated and other features, advantages and objects, the Position Billboard aspect of an embodiment of the invention utilizes computer hardware and software including, for example, one or more graphical user interfaces, data stores, servers, and a matching engine, to provide a method and system for trading long and short inventory positions in securities for participants that involves, for example, allowing each of the participants to enter information via a graphical user interface that defines restrictions on trading long and short positions in securities of the participant and also information that defines substitution parameters for adjusting the long and short positions of the participant. Thereafter, each of the participants is allowed to upload position file data on net long and net short positions of the participant, as well as trades file data on repo and reverse repo security transactions of the participant for adjusting the long and short positions of the participant.

In the Position Billboard aspect of an embodiment of the invention, the long and short positions of each participant are then adjusted based on the substitution parameters and the trades file data of the participant, and a position file with first round adjustments for the participant is output. Each participant's long and short positions with first round adjustments is then adjusted based on the security restrictions of the participant and a position file with second round adjustments is output. Utilizing each participant's position file with second round adjustments, a matching engine identifies short covering and long funding matches for the participant, generates corresponding repo and reverse trades for the participant, and outputs an executed trades file of the participant's trades. The restrictions can include, for example, filters for restricting and/or excluding predetermined long and short positions in the securities of the participant, a list of securities for lending and borrowing for the participant, lending and/or borrowing limits on an individual security basis for the participant, and/or restrictions on trading counterparties for the participant.

In adjusting the long and short positions for each participant based on the substitution parameters and trades file data, for each long position of the participant available for lending, adjustments are determined for day-to-day reverses and reverses with rights of substitution, for example, for each long position of the participant available for lending, by (a) calculating a sum "t" of day-to day-reverses, (b) obtaining a pre-defined percentage value factor "u" from the substitution parameters for an asset class and transaction type for the long position available for lending, and (c) multiplying the sum t by the factor u to obtain the adjustment for day-to-day reverses "w." In addition, for each long position of the participant available for lending, (a) a sum "x" of the reverses is calculated, (b) a pre-defined percentage value factor "y" is obtained from the substitution parameters for the asset class and transaction type combination for the long position available for lending, and (c) the sum x is multiplied by the factor y to obtain the adjustment for reverses with rights of substitution "z." The amount available for lending is adjusted to be the greater of zero and an original long position of the participant minus the adjustment for day-to-day reverses w minus the adjustment for reverses with rights of substitution z.

Additionally, in the Position Billboard aspect of an embodiment of the invention, in adjusting the long and short positions for each participant based on the substitution parameters and trades file data, for each short position of the participant available for borrowing, adjustments are determined for day-to-day repos, and for each short position of the participant available for lending, adjustments are determined for repos with rights of substitution. For each short position of the participant available for borrowing, the adjustment for day-to-day repos is determined by (a) calculating a sum "e" of the day-to-day repos, (b) obtaining a pre-defined percentage value factor "f" from the substitution parameters for an applicable asset class and transaction type for the short position available for borrowing, and (c) multiplying the sum e by the a factor f to obtain the adjustment for day-to-day repos "g." Thus, for each short position of the participant available for borrowing, the adjustment for repos with rights of substitution is determined by (a) calculating a sum "j" of repos, (b) obtaining a pre-defined percentage value factor "k" from the substitution parameters file for an asset class and transaction type for the short term position available for lending, and (c) multiplying the sum j by the factor k to obtain the adjustment for repos with right of substitution "m." The amount available for lending is adjusted to be the greater of zero and an original short position of the participant minus the adjustment for day-to-day repos g minus the adjustment for repos with right of substitution m (wherein it is assumed that the quantities are represented by positive numbers).

In adjusting each participant's long and short positions based on the security restrictions in the Position Billboard aspect of an embodiment of the invention, utilizing the participant's position file and the security restrictions for each long position of the participant available for lending, adjustments for percentage limitations are determined for the long positions, for example, by (a) multiplying the long position by the percentage allowed to lend to obtain the product "n," and (b) adjusting the long position to equal the lesser of the product n and the long quantity from the position file with first round adjustments. In addition, utilizing the participant's position file with first round adjustments and the security restrictions, for each participant long position available for lending, an adjustment is determined for fixed quantity limitations by adjusting the long position available for lending to equal the lesser of a fixed quantity established in the security restrictions and a long quantity from the position file with first round adjustments.

Further, in the Position Billboard aspect of an embodiment of the invention, the identification of short covering and long funding matches and generation the of corresponding repo and reverse trades for each participant involves, for each security, calculating an aggregate value of the long positions and the short positions for all of the participants, and if the aggregate value of the short positions for all of the participants is greater than the aggregate value of the long positions for all of the participants, (a) for each long participant, booking a repo with a trade quantity equal to a long position quantity of the participant; and (b) for each short participant, booking a reverse with a trade quantity equal to a short position quantity of the participant multiplied by a long ratio calculated as the aggregate value of the long positions divided by the aggregate value of the short positions for the security. However, if the aggregate value of the short positions for all of the participants is less than or equal to the aggregate value of the long positions for all of the participants, (a) for each short participant, a reverse is booked with a trade quantity equal to the participant's short position quantity; and (b) for each long participant, a repo is booked with a trade quantity equal to long position quantity of the participant multiplied by a short ratio calculated as the aggregate value of the short positions divided by the aggregate value of the long positions for the security.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 3 is a flow chart that illustrates an example of the position adjustment—first pass process for each short position available for borrowing in the Position Billboard aspect of an embodiment of the invention;

DETAILED DESCRIPTION

Figure 1:
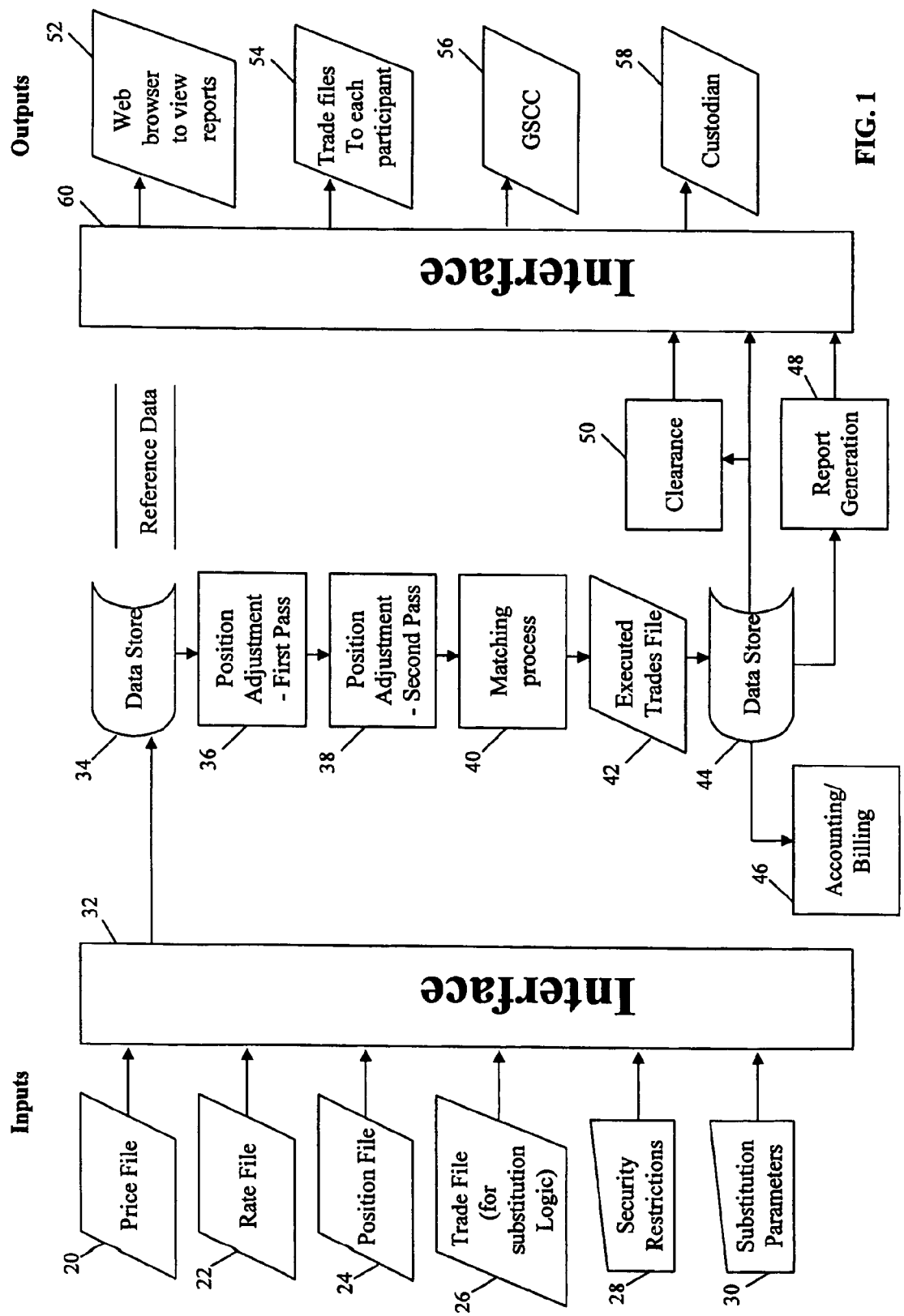
FIG. 1 is a schematic flow chart that illustrates an example of key components and the flow of information between key components of the Position Billboard aspect in accordance with an embodiment of the present invention.

Reference is now made in detail to an embodiment of the present invention, an example of which is illustrated in the accompanying drawings, showing a method and system for the Position Billboard aspects.

Position Billboard Aspect

The Position Billboard aspect comprises a securities short covering system and method that includes services to allow trading members participating in the Position Billboard system (participants) to cover their non-tight (i.e., securities trading less than 25 bps through GC) short positions at more attractive financing rates than current industry alternatives. The Position Billboard aspect can work with either an existing broker dealer or an existing SEC-registered inter-dealer broker. It enables various participants, such as securities market and/or financial services participants to submit and trade their long and short inventory positions in securities. To that end, the Position Billboard aspect can make use of the infrastructure of the existing broker dealer or inter-dealer broker, with modifications to include the Position Billboard engine and communication capability with the various participants, for trades to run through. Alternatively, the Position Billboard aspect can have its own license obtained from the SEC, wherein it can develop the entire infrastructure to establish its system, method, and services.

According to preferred embodiments of the present invention, the Position Billboard aspect can systematically obtain long and short position information from each participant, process the information in accordance with participant-controlled parameters, match the participants' short positions to other participants' long positions and feed the resultant activity back to each participant in the form of system-generated repo and reverse repo trades, all the while keeping the anonymity of the participants. Benefits of the Position Billboard aspect include, for example: reduction in borrowing costs to participants through reduced fees; reduction in margin requirements, thereby saving working capital for the borrower; attraction of collateral by enabling participants to further reduce their borrow costs and/or earn incremental revenue for their non-tight lending; and creation of balance sheet netting opportunities by booking both trades as repos/reverse repos that are novated to GSCC. Additional benefits of the Position Billboard aspect include, for example: increase of liquidity in the lending market by having more collateral available for lending; anonymity of participants by acting as principal or third party agent; and creation of sales force efficiencies by enabling them to focus on revenue generating opportunities.

In order to maintain anonymity and facilitate settlement of on-side finance transactions, a third party entity (TP entity) can be set up to control and maintain the Position Billboard aspect and to act as an agent counterparty to each of the participants (i.e., participating trading members) for their on-side transactions. In such case, the participants have no inquiry capability to identify the true counterparties involved in the tradings. Alternatively, the TP entity can be set up as a principal counterparty. Information transmission to and from the Position Billboard aspect and information processing within the Position Billboard aspect remains the same whether the TP entity acts as agent or principal for trade executions. The difference lies more in the risks (e.g., legal risk, operational risk, liquidity risk, fails risk) for an agent and those for a principal, wherein such risks are as understood by those skilled in the art.

Trading members may include but are not limited to broker-dealers, securities lenders, securities issuers, mutual funds, investors, and other dealers. They have the ability to establish certain filters or criteria that can effectively restrict and/or exclude certain positions (long and/or short) from the Position Billboard system. These filters may be based on security type, counterparty type, individual CUSIP, or maturity range. Members also have the ability to maintain certain processing parameters that, for example, determine a minimum/maximum notional size at which they are willing to trade and/or a specific issue "pecking order" by which they want their long and short positions utilized. The filter restrictions/exclusions and processing parameters can reside on each member's client side of a Chinese wall (e.g., system firewall) to insure that only desired positions are downloaded from the member to the Position Billboard matching process.

The processing flow as implemented in the Position Billboard aspect includes functionality, such as exclusion/restriction criteria for securities and/or for counterparties (when Position Billboard acts as agent execution only), substitution parameters, upload position data and/or existing repo and reverse repo transaction data, systematically adjust positions based on substitution parameters, execute matching process, transmit trades to members, and view on-line reports.

FIG. 1 is a schematic flow chart that illustrates example key components and the flow of information between key components in the Position Billboard aspect for an embodiment of the present invention. Referring to FIG. 1, inputs for the processing flow in the Position Billboard aspect include, for example, a price file 20, a rate file 22, a position file 24, a trades file 26 for substitution logic, security restrictions 28, and substitution parameters 30. Interfaces 32 are provided in order to receive, for example, the price file 20, the rate file 22, the position file 24 and the trades file 26 information, which is stored in data storage 34. In addition, the Position Billboard processing functionality includes, for example, a position adjustment—first pass 36 based on substitution parameters 30, a position adjustment—second pass 38 based on security restrictions 28, a matching process 40, an executed trade files 42, data storage 44, accounting-billing 46, report generation 48, and clearance 50. Further, outputs of the processing flow in the Position Billboard aspect include, for example, web browser to view reports 52, trade files to each participant 54, GSCC 56, and custodian 58, which are output via output interfaces 60.

Referring to FIG. 1, the price file 20 provides a price feed with clean price and accrued interest, for example, for U.S. treasuries, U.S. agencies, foreign sovereigns, and credit products, and the rate file 22 contains, for example, one-day rates indicative of U.S. treasury general collateral and U.S. agency general collateral funding levels on an overnight basis. The position file 24 from each participant contains a participant's net long and net short positions by CUSIP (or some other security identifier) provided by each participant. Each participant is required to provide a position file 24 daily by a specified time, and if a participant does not comply, the participant will not be included in the matching process 40. The trades file 26 (for substitution logic) provided by each participant contains, for example, day-to-day repos, day-to-day reverses, term repos with rights of substitution and term reverses with rights of substitution for "in scope" collateral types. This information is used to adjust long and short positions during the position adjustment—first pass process 36.

Referring further to FIG. 1, a graphical user interface allows security restrictions 28 to be entered by each participant, captured, and maintained and enables members to define restrictions on positions. Specifically, the restrictions enable members to establish a lending or borrowing limit in either percentage terms or a fixed amount on an individual security basis and to establish a lending and borrowing limit in percentage terms or a fixed amount applicable to every individual CUSIP within an asset class, on an asset class basis. This information is utilized in the position matching process 40. A graphical user interface also allows substitution parameters 30 to be entered by each participant, captured, and maintained, which are utilized in the position adjustment—second pass process 38 to systematically adjust long and short positions. Members enter parameters by collateral type (e.g., U.S. treasuries, agencies) for day-to-day repos, term repos with rights of substitution, day-to-day reverses, and term reverses with rights of substitution source. The information can be updated at anytime, but does not need to be refreshed.

Referring again to FIG. 1, interfaces 32 are provided in order to receive, for example, the price file 20, the rate file 22, the position file 24 and the trades file information 26, which is stored in data store 34. A participant database contains account information for each participant entered manually via an input facility and includes, for example, delivery instructions, contact information, billing information, and the like, and a security master database contains data attributes for Position Billboard-eligible securities, including asset class, received from external vendors and/or entered manually via an input facility.

In the Position Billboard aspect of an embodiment of the invention, trading members have the ability to establish certain lending/borrowing (repo/reverse repo) "criteria" for securities and counterparties. The security criteria allow a member to: i) define restrictions on positions: ii) establish a list of CUSIPs for trading (lending and borrowing); iii) on an individual security basis, establish a lending or borrowing limit in either percentage terms or a fixed amount; and iv) on an asset class basis (e.g., all U.S. treasury securities are classed together, all U.S. agency bonds are classed together), establish a lending or borrowing limit in percentage terms or a fixed face (par or notional) amount applicable to every individual CUSIP within the asset class. The security criteria can also include exclusion filters that allow trading members to exclude positions from the matching process based upon pre-defined parameters they entered. As mentioned earlier, these exclusion filters can be by notional size (high, low, or a range), security type, counterparty type, CUSIP number, and/or maturity range.

For agent execution by the Position Billboard aspect, the counterparty criteria allow a member to define restrictions on the true counterparties masked by the TP entity controlling the Position Billboard aspect. These restrictions include: i) specifying members with whom the member will or will not trade, and ii) specifying trading limits with the specified counterparty members or other members by borrow activity, loan activity, or both in total. Because a first member could gain insight to a second member's positions by restricting all counterparties except the second member, each member must agree to trade in some capacity with at least a predetermined number of other members. This number may be defined by the administrator of the Position Billboard system to sufficiently safeguard and maintain member anonymity (e.g., the minimum can be set at three). As mentioned earlier, the maintenance of both the security and counterparty criteria may be handled by each member to insure that only desired positions of the member are available for borrowing and lending. These criteria can be set by each member prior to the start of the trading day. They can also be adjusted intra-day, wherein any subsequent position refreshes will be applied.

Once the security and counterparty criteria are established, each member can download or upload its long and short positions, as well as their repo and reverse repo transactions (open, term, and overnight), into the Position Billboard system. This download may be done through the substitution adjustment functionality in the Position Billboard processing flows which allows members to upload their term repos with rights of substitution, term reverse repos with rights of substitution, open (day-to-day) repos and open reverse repos, as well as their position data. Substitution refers to the right of a trading member to substitute a collateral out on a term repo with another collateral. This right can be reserved by the trading member in the term repo. Because there are fees involved in borrowing securities from others, trading members can avoid needless borrowing, and thus associated fees, by invoking their substitution rights to cover their short positions with collaterals they already have out on term repos at no cost. Likewise, open repos are considered because the trading member can close out these repos anytime at no cost to obtain the associated collaterals to cover short positions.

Based upon a member's substitution parameters 30 and agreed-upon processing rules, the Position Billboard substitution adjustment functionality first attempts to cover a member's shorts by adjusting for possible substitutions and keeps track of the member's original start-of-day positions and the results of the substitution adjustments. In other words, the Position Billboard aspect can adjust the member's short positions to incorporate possible closeouts of open repos and substitutions on term repos. This is accomplished by allowing members to define adjustment factors for: i) closeouts of open repos, ii) substitutions on term repos, iii) closeouts of reverse repos, and iv) substitutions on term reverse repos. For each short position, adjustments can be made to incorporate closeouts of open repos and substitutions on term repos, where the short position is being used. The corresponding adjustment factors can be multiplied by the possible closeouts and substitutions, then applied to the member's original start-of-day positions. Additionally, a member's substitution parameters 30 can reduce its long positions to incorporate the possibility of being pulled on an open reverse repo or substituted on a term reverse repo. Parameters for the adjustment factors and possible closeouts and substitutions can be set by each member as desired, and such parameters can be adjusted over time.

In the Position Billboard aspect of an embodiment of the invention, the position adjustment process—first pass 36 adjusts a given participant's long and short positions based on the participant's substitution parameters 30 and trades file 26 and outputs a position file 24 with first round adjustments by participant. This adjustment protects the participant from borrowing securities to cover a short that could have been covered by closing out a day to day repo or substituting a term repo trade. Additionally, it protects the participant from lending securities that could be "pulled" back by a counterparty on a day-to-day reverse or term reverse.

Figure 2:
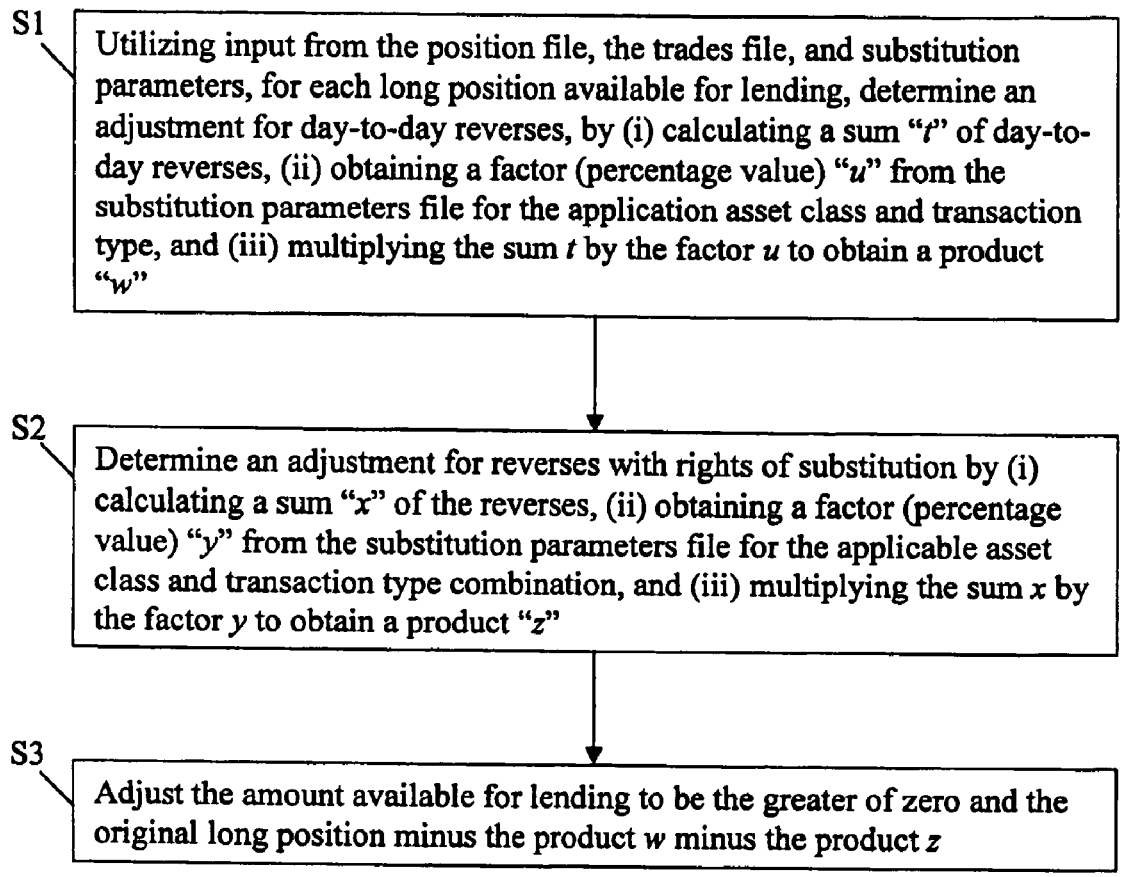
FIG. 2 is a flow chart that illustrates an example of the position adjustment—first pass process for each long position available for lending in the Position Billboard aspect of an embodiment of the invention.

FIG. 2 is a flow chart that illustrates an example of the position adjustment—first pass process 36 for each long position available for lending in the Position Billboard aspect of an embodiment of the invention. Utilizing input from position file 24, trades file 26, and substitution parameters 30, for each long position available for lending, at S1, an adjustment is determined for day-to-day reverses, by (i) calculating a sum "t" of day to day reverses, (ii) obtaining a factor (percentage value) "u" from the substitution parameters file 30 for the applicable asset class and transaction type, and (iii) multiplying the sum t by the factor u to obtain a product "w." At S2, an adjustment for reverses with rights of substitution is determined by (i) calculating a sum "x" of the reverses, (ii) obtaining a factor (percentage value) "y" from the substitution parameters file 30 for the applicable asset class and transaction type combination, and (iii) multiplying the sum x by the factor y to obtain a product "z." At S3, the amount available for lending is adjusted to be the greater of zero and the original long position minus the product w minus the product z.

FIG. 3 is a flow chart that illustrates an example of the position adjustment—first pass process 36 for each short position available for borrowing in the Position Billboard aspect of an embodiment of the invention. Likewise, utilizing input from position file 24, trades file 26, and substitution parameters 30, for each short position available for borrowing, at S4, an adjustment is determined for day to day repos by (i) calculating the sum "e" of the day-to-day repo, (ii) obtaining a factor (percentage value) "f" from the substitution parameters file 30 for the applicable asset class and transaction type, and (iii) multiplying the sum e by the a factor f to obtain a product "g." At S5, an adjustment is determined for repos with rights of substitution by (i) calculating the sum "j" of repos, (ii) obtaining a factor (percentage value) "k" from the substitution parameters file for the applicable asset class and transaction type combination, and (iii) multiplying the sum j by the factor k to obtain a product "m." At S6, the amount available for borrowing is adjusted to be the greater of zero and the original long position minus the product g minus the product m (wherein it is assumed that the quantities are represented by positive numbers).

Figure 4:
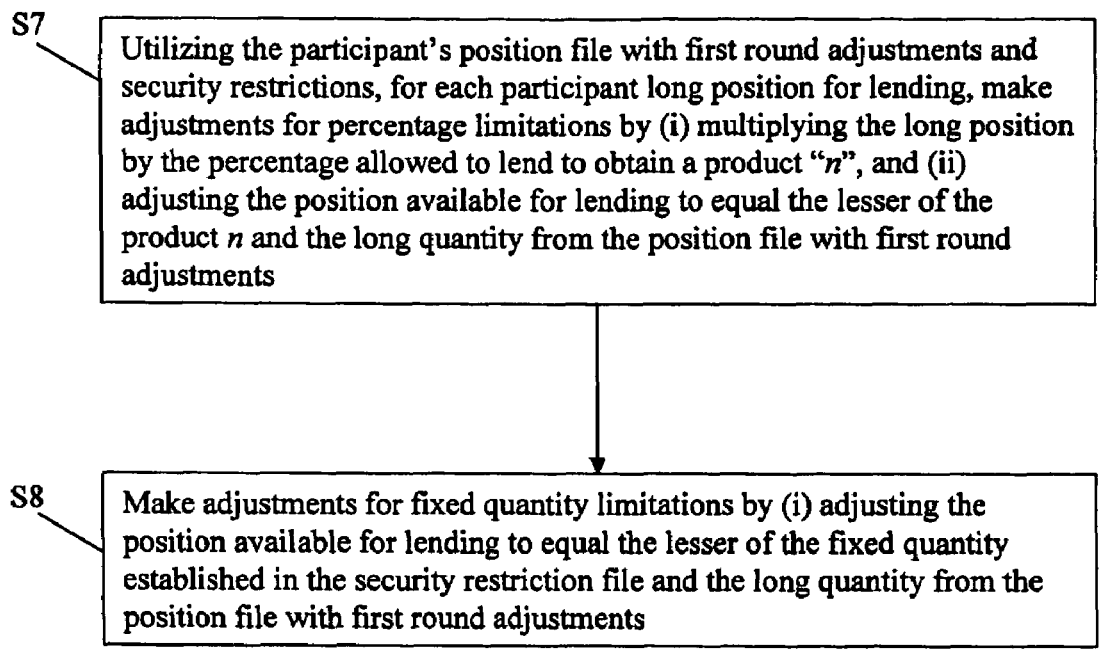
FIG. 4 is a flow chart that illustrates an example of the position adjustment—second pass process for each long position available for lending in the Position Billboard aspect of an embodiment of the invention.

The position adjustment process—second pass process 38 of the Position Billboard aspect of an embodiment of the invention adjusts each participant's long and short positions by applying the participant's security restriction criteria and outputs a position file 24 with second round adjustments. FIG. 4 is a flow chart that illustrates an example of the position adjustment—second pass process 38 for each long position available for lending in the Position Billboard aspect of an embodiment of the invention. In the position adjustment—second pass process 38, for each participant long position available for lending, two rules apply, namely, (i) if a restriction has been entered for the asset class and the individual security, the security level restriction is applied; otherwise, any defined restriction is applied, and (ii) if both a percentage and fixed quantity limit are defined, the more restrictive limit is applied.

Referring to FIG. 4, utilizing the participant's position file 24 and security restrictions 28, for each participant long position available for lending, at S7, adjustments for percentage limitations are made by (i) multiplying the long position by the percentage allowed to lend to obtain a product "n," and (ii) adjusting the position available for lending to equal the lesser of the product n and the long quantity from the position file 24 with first round adjustments. At S8, adjustments for fixed quantity limitations are made by (i) adjusting the position available for lending to equal the lesser of the fixed quantity established in the security restriction file 28 and the long quantity from the position file 24 with first round adjustments.

Figure 5:
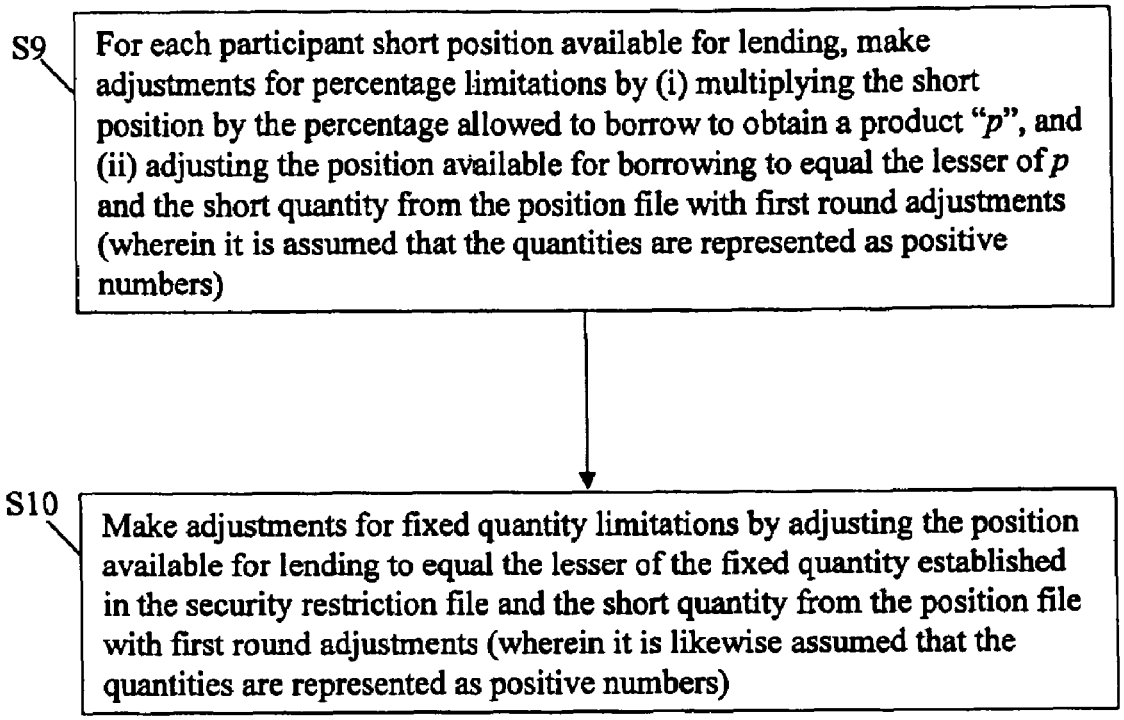
FIG. 5 is a flow chart that illustrates an example of the position adjustment—second pass process for each short position available for lending in the Position Billboard aspect of an embodiment of the invention.

FIG. 5 is a flow chart that illustrates an example of the position adjustment—second pass process 38 for each short position available for lending in the Position Billboard aspect of an embodiment of the invention. In the position adjustment—second pass process 38, for each participant short position available for lending, two rules likewise apply, namely, (i) if a restriction has been entered for the asset class and the individual security, the security level restriction is applied; otherwise, any defined restriction is applied, and (ii) if both a percentage and fixed quantity limit are defined, the more restrictive limit is applied.

Referring to FIG. 5, for each participant short position available for borrowing, at S9, adjustments for percentage limitations are made by (i) multiplying the short position by the percentage allowed to borrow to obtain a product "p," and (ii) adjusting the position available for borrowing to equal the lesser of p and the short quantity from the position file 24 with first round adjustments (wherein it is assumed that the quantities are represented as positive numbers). Referring further to FIG. 5, for each participant short position available for lending, at S10, adjustments are made for fixed quantity limitations by adjusting the position available for borrowing to equal the lesser of the fixed quantity established in the security restriction file 28 and the short quantity from the position file 24 with first round adjustments (wherein it is likewise assumed that the quantities are represented as positive numbers).

After the long and short positions are adjusted to reflect substitution assumptions, the Position Billboard aspect matches remaining short positions of each member with other members' remaining long positions and generate the appropriate repo/reverse transactions. For example, an overnight repo transaction will be generated for a member with the long position, and an overnight reverse repo will be generated for a corresponding member with the short position, each with the agreed upon overnight interest rate. Trades recreated by a position matching engine are considered executed trades. In the event the total long position is greater than the total short position for a given CUSIP, the lending occurs through a pro-rata allocation methodology, wherein the total long positions from all trading members are matched against the total short positions from all trading members on a pro-rata basis, so that all members involved in the trading/matching are treated equally. For example, all trading members with long positions for a given CUSIP are gathered into a first group, and all trading members with short positions for the given CUSIP are gathered into a second group. On a pro-rata basis, the long positions are repoed to each member in the second group. Thus, all trading members are satisfied. Similarly, when the total short position is greater than the total long position for a given CUSIP, the borrowing also occurs through the pro-rata allocation methodology. Here, the total long positions are given pro-rata to each member in the second group based on the short position of such member in view of the total short positions in the second group.

Figure 6:
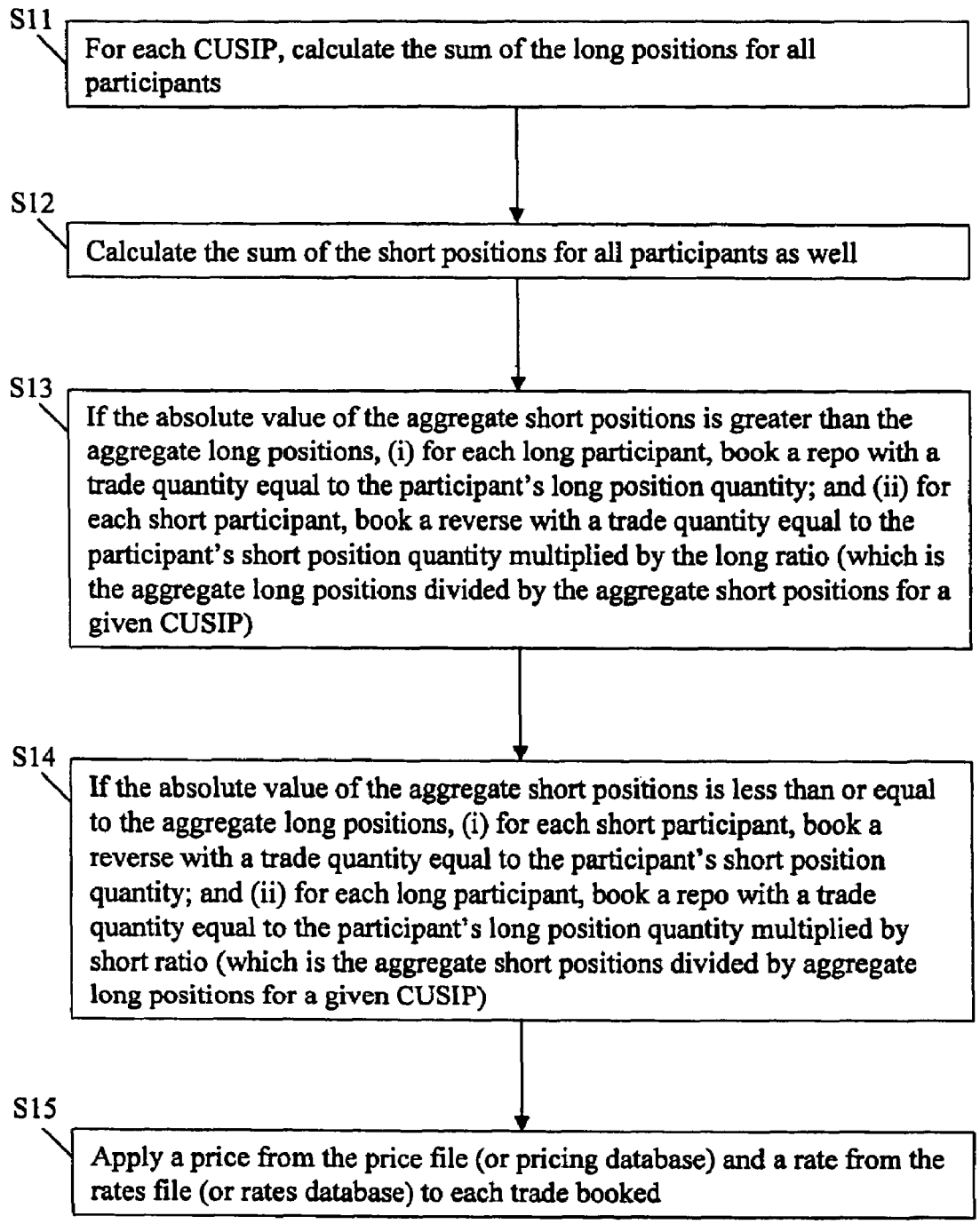
FIG. 6 is a flow chart that illustrates an example of the matching process in the Position Billboard aspect of an embodiment of the invention.

FIG. 6 is a flow chart that illustrates an example of the matching process 40 in the Position Billboard aspect of an embodiment of the invention. The matching process 40 is triggered by the completion of the position adjustment—second pass process 38 and pools long positions and short positions. Utilizing each participant's position file 24 after the second round revisions, the matching process 40 identifies short covering and long funding matches to generate the appropriate repo and reverse trades and outputs an executed trades file 42 containing participant trades and RPWire trades.

Referring to FIG. 6, in the matching process 40, for each CUSIP, at S11, the sum of the long positions for all participants is calculated, and at S12, the sum of the short positions for all participants is likewise calculated. At S13, if the absolute value of the aggregate short positions is greater than the aggregate long positions, (i) for each long participant, a repo is booked with a trade quantity equal to the participant's long position quantity; and (ii) for each short participant, a reverse is booked with a trade quantity equal to the participant's short position quantity multiplied by the long ratio (which is the aggregate long positions divided by the aggregate short positions for a given CUSIP). At S14, if the absolute value of the aggregate short positions is less than or equal to the aggregate long positions, (i) for each short participant, a reverse is booked with a trade quantity equal to the participant's short position quantity; and (ii) for each long participant, a repo is booked with a trade quantity equal to the participant's long position quantity multiplied by short ratio (which is the aggregate short positions divided by aggregate long positions for a given CUSIP). RPWire's perspective of the tickets generated in steps S13 and S14 are booked. At S15, a price from the price file 20 (or pricing database) and a rate from the rates file 22 (or rates database) is applied to each trade booked. The executed trades file 42 is the output from the matching process 40, and the executed trades file storage process 44 records the data from the executed trades file 42 on a daily basis. Previous day and historical trades are also maintained in the executed trades database.

Thereafter, the repo and reverse repo trades are fed to the respective members' proprietary systems for position updating and settlement processing. As mentioned earlier, the counterparty to each trade is the TP entity, and each member delivers/receives securities to/from an account of the TP entity. The electronic distribution of executed trades can provide publish/subscribe-distribution technology that allows members to receive executions in real time mode or to retrieve executed trades intermittently. These trades flow into the members' proprietary systems in a standard output format dictated by the position matching engine in the Position Billboard aspect.

Members have electronic inquiry capability to view only their own standard criteria, restrictions, substitution parameters, downloaded start-of-day positions, positions excluded from the start-of-day download, executed trades and current positions. This information is also available in electronic form to facilitate reconciliation. Procedures are also applied for the protection of potentially competitive data that members may not wish to disclose to others. The report browser 52 enables each participant to view various reports through an online viewer. The reports include, for example, loaded positions, positions available for borrowing and lending (i.e., the position file 24 with second round adjustments), trades (i.e., repos and reverse with total for each category), and current positions (i.e., the original position information adjusted for activity from the executed trades file 42), and both long and short reports are available. However, participants are able to see only their own activity and are not able to see other participants' information or RPWire information.

The accounting/billing process 46, the input for which is the executed trades file 42 and the participant database, handles the accounting and billing associated with the executed trades. Additionally, the accounting and billing process handles the accounting/bookkeeping associated with the continued operation of RPWire, external reporting requirements, and human resources. An asset class grouping database, the input for which is the security master database and manual entry through a graphical user interface, enables RPWire employees to define the asset class for each CUSIP. The graphical user interface includes, for example a first window for CUSIPs without asset class designations displaying a list of all asset classes on the top of the page. When a user clicks on an asset class, the CUSIPs in that asset class populate into a second window. Transfer buttons or arrows are provided on the first and second windows. A button with an arrow pointed towards the second window transfers the highlighted CUSIPs in the first window to the second window, and a button with an arrow pointed towards the first window transfers highlighted CUSIPs in the second window to the first window. Multiple CUSIPs can be highlighted by holding down either the ALT or the CTRL keys.

A criteria for minimum trade sizes function allows a minimum trade size to be defined by manual entry. A participant administration functionality allows each participant firm to have a pre-determined number of system administrators (super-users), which are able to create user profiles for employees of their firm via manual entry. The user profile includes the screens that the user is allowed to access and the type of access, such as read-only, create/delete/modify, and the like.

The Position Billboard aspect can run one or more batch process per day, with established cutoff times for transmitting the requisite data. Daily, the first batch process can run between trading days, i.e., prior to the "start of business" for the next trading day, to insure that all entered trading information has been taken into consideration. The batches can come into the Position Billboard system via FTP or messaging. Alternatively, there can be one or more Position Billboard aspect processing cycles so that members can have the opportunity to submit their positions for multiple processing times with associated cutoff times. The Position Billboard aspect can also obtain vendor prices for use in calculating the market value on the substitution and the repo and reverse repo transactions.

According to the preferred embodiments of the invention, trade transactions may be novated to GSCC for cost savings in fees and federal wire charges, as well as, to increase balance sheet netting opportunities. The preferred embodiments of the present invention also provide a pricing methodology for charging user-fees to participating trading members of the Position Billboard aspect. The billing criteria can include: 1) bp fee based on trade volume; 2) the ability to vary the bp fee by customer (i.e., trading member); and 3) per transaction fee for trades either by customer or for trades below a certain threshold.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

What is claimed is:

1. A method of trading long and short inventory positions in securities for a plurality of participants, comprising:
    allowing each of the participants to enter information via a graphical user interface defining restrictions on trading long and short positions in securities of the participant and information defining substitution parameters for adjusting the long and short positions of the participant;
    allowing each of the participants to upload position file data on net long and net short positions of the participant;
    allowing each of the participants to upload trades file data on repo and reverse repo security transactions of the participant for adjusting the long and short positions of the participant;
    adjusting, by software executed by computer hardware, the long and short positions of each participant based on the substitution parameters and the trades file data of the participant and outputting a position file with first round adjustments for the participant;
    adjusting, by software executed by computer hardware, each participant's long and short positions with first round adjustments based on the security restrictions of the participant and outputting a position file with second round adjustments; and
    utilizing, by software executed by computer hardware, each participant's position file with second round adjustments, identifying, by software executed by computer hardware, short covering and long funding matches for the participant, generating, by software executed by computer hardware, corresponding repo and reverse trades for the participant, and outputting, by software executed by computer hardware, an executed trades file of the participant's trades by a matching engine.

2. The method of claim 1, wherein allowing each of the participants to enter information defining the restrictions further comprises allowing each of the participants to enter information establishing filters for at least one of restricting and excluding predetermined long and short positions in the securities of the participant.

3. The method of claim 1, wherein allowing each of the participants to enter information defining the restrictions further comprises allowing each of the participants to enter information for establishing a list of securities for lending and borrowing for the participant.

4. The method of claim 1, wherein allowing each of the participants to enter information defining the restrictions further comprises allowing each of the participants to enter information for establishing one of a lending and borrowing limit on an individual security basis for the participant.

5. The method of claim 1, wherein allowing each of the participants to enter information defining the restrictions further comprises allowing each of the participants to enter information for defining restrictions on trading counterparties for the participant.

6. The method of claim 1, wherein adjusting the long and short positions for each participant based on the substitution parameters and trades file data of the participant further comprises adjusting each long position of the participant available for lending.

7. The method of claim 1, wherein adjusting the long and short positions for each participant based on the substitution parameters and trades file data of the participant further comprises, for each long position of the participant available for lending, determining adjustments for day-to-day reverses and reverses with rights of substitution.

8. A method of trading long and short inventory positions in securities for a plurality of participants, comprising:
    allowing each of the participants to enter information via a graphical user interface defining restrictions on trading long and short positions in securities of the participant and information defining substitution parameters for adjusting the long and short positions of the participant;
    allowing each of the participants to upload position file data on net long and net short positions of the participant;
    allowing each of the participants to upload trades file data on repo and reverse repo security transactions of the participant for adjusting the long and short positions of the participant;
    adjusting, by software executed by computer hardware, the long and short positions of each participant based on the substitution parameters and the trades file data of the participant and outputting a position file with first round adjustments for the participant;
    adjusting, by software executed by computer hardware, each participant's long and short positions with first round adjustments based on the security restrictions of the participant and outputting a position file with second round adjustments; and
    utilizing, by software executed by computer hardware, each participant's position file with second round adjustments, identifying, by software executed by computer hardware, short covering and long funding matches for the participant, generating, by software executed by computer hardware, corresponding repo and reverse trades for the participant, and outputting, by software executed by computer hardware, an executed trades file of the participant's trades by a matching engine;

wherein adjusting the long and short positions for each participant based on the substitution parameters and trades file data of the participant further comprises, for each long position of the participant available for lending, determining, by software executed by computer hardware, adjustments for day-to-day reverses and reverses with rights of substitution; and wherein determining the adjustment for day-to-day reverses further comprises, for each long position of the participant available for lending:
 (a) calculating a sum "t" of day-to day-reverses,
 (b) obtaining a pre-defined percentage value factor "u" from the substitution parameters for an asset class and transaction type for the long position available for lending, and
 (c) multiplying the sum t by the factor u to obtain the adjustment for day-to-day reverses "w."

9. The method of claim 8, wherein determining the adjustment for reverses with rights of substitution further comprises, for each long position of the participant available for lending:
 (a) calculating a sum "x" of the reverses,
 (b) obtaining a pre-defined percentage value factor "y" from the substitution parameters for the asset class and transaction type combination for the long position available for lending, and
 (c) multiplying the sum x by the factor y to obtain the adjustment for reverses with rights of substitution "z."

10. The method of claim 9, wherein adjusting the long and short positions for each participant based on the substitution parameters and trades file data of the participant further comprises adjusting the amount available for lending to be the greater of zero and an original long position of the participant minus the adjustment for day-to-day reverses w minus the adjustment for reverses with rights of substitution z.

11. The method of claim 1, wherein adjusting the long and short positions for each participant based on the substitution parameters and trades file data of the participant further comprises adjusting each short position of the participant available for borrowing.

12. The method of claim 1, wherein adjusting the long and short positions for each participant based on the substitution parameters and trades file data of the participant further comprises, for each short position of the participant available for borrowing, determining adjustments for day-to-day repos, and for each short position of the participant available for lending, determining adjustments for repos with rights of substitution.

13. A method of trading long and short inventory positions in securities for a plurality of participants, comprising:
 allowing each of the participants to enter information via a graphical user interface defining restrictions on trading long and short positions in securities of the participant and information defining substitution parameters for adjusting the long and short positions of the participant;
 allowing each of the participants to upload position file data on net long and net short positions of the participant;
 allowing each of the participants to upload trades file data on repo and reverse repo security transactions of the participant for adjusting the long and short positions of the participant;
 adjusting, by software executed by computer hardware, the long and short positions of each participant based on the substitution parameters and the trades file data of the participant and outputting a position file with first round adjustments for the participant;
 adjusting, by software executed by computer hardware, each participant's long and short positions with first round adjustments based on the security restrictions of the participant and outputting a position file with second round adjustments; and
 utilizing, by software executed by computer hardware, each participant's position file with second round adjustments, identifying, by software executed by computer hardware, short covering and long funding matches for the participant, generating, by software executed by computer hardware, corresponding repo and reverse trades for the participant, and outputting, by software executed by computer hardware, an executed trades file of the participant's trades by a matching engine;

wherein adjusting the long and short positions for each participant based on the substitution parameters and trades file data of the participant further comprises, for each short position of the participant available for borrowing, determining, by software executed by computer hardware, adjustments for day-to-day repos, and for each short position of the participant available for lending, determining adjustments for repos with rights of substitution; and wherein determining the adjustment for day-to-day repos further comprises, for each short position of the participant available for borrowing:
 (a) calculating a sum "e" of the day-to-day repos,
 (b) obtaining a pre-defined percentage value factor 'f' from the substitution parameters for an applicable asset class and transaction type for the short position available for borrowing, and
 (c) multiplying the sum e by the a factor f to obtain the adjustment for day-to-day repos "g."

14. The method of claim 13, wherein determining the adjustment for repos with rights of substitution further comprises, for each short position of the participant available for lending:
 (a) calculating a sum "j" of repos,
 (b) obtaining a pre-defined percentage value factor "k" from the substitution parameters file for an asset class and transaction type for the short term position available for lending, and
 (c) multiplying the sum j by the factor k to obtain the adjustment for repos with right of substitution "m."

15. The method of claim 14, wherein adjusting the long and short positions for each participant based on the substitution parameters and trades file data of the participant further comprises adjusting the amount available for borrowing to be the greater of zero and an original short position of the participant minus the adjustment for day-to-day repos g minus the adjustment for repos with right of substitution m, wherein it is assumed that the quantities are represented as positive numbers.

16. The method of claim 1, wherein adjusting each participant's long and short positions based on the security restrictions further comprises utilizing the participant's position file and the security restrictions, adjusting each long position of the participant available for lending.

17. The method of claim 1, wherein adjusting each participant's long and short positions based on the security restrictions further comprises, utilizing the participant's position file with first round adjustments and the security restrictions for each long position of the participant available for lending, determining adjustments for percentage limitations for the long positions.

18. The method of claim 17, wherein determining the adjustments for percentage limitations for the long positions further comprises, for each long position of the participant available for lending:
  (a) multiplying the long position by the percentage allowed to lend to obtain the adjustment for percentage limitation "n," and
  (b) adjusting the long position to equal the lesser of the adjustment for percentage limitation n and a long quantity from the position file with first round adjustments.

19. The method of claim 18, wherein adjusting each participant's long and short positions based on the security restrictions further comprises, utilizing the participant's position file with first round adjustments and the security restrictions, for each participant long position available for lending, determining an adjustment for fixed quantity limitations by adjusting the long position available for lending to equal the lesser of a fixed quantity established in the security restrictions and a long quantity from the position file with first round adjustments.

20. The method of claim 1, wherein identifying the short covering and long funding matches and generating corresponding repo and reverse trades for each participant further comprises, for each security, calculating an aggregate value of the long positions and the short positions for all of the participants, and if the aggregate value of the short positions for all of the participants is greater than the aggregate value of the long positions for all of the participants:
  (a) for each long participant, booking a repo with a trade quantity equal to a long position quantity of the participant; and
  (b) for each short participant, booking a reverse with a trade quantity equal to a short position quantity of the participant multiplied by a long ratio calculated as the aggregate value of the long positions divided by the aggregate value of the short positions for the security.

21. The method of claim 1, wherein adjusting each participant's long and short positions based on the security restrictions further comprises utilizing the participant's position file and the security restrictions to adjust each short position of the participant available for borrowing.

22. The method of claim 1, wherein adjusting each participant's long and short positions based on the security restrictions further comprises, utilizing the participant's position file with first round adjustments and the security restrictions for each short position of the participant available for borrowing, determining adjustments for percentage limitations for the short positions.

23. A method of trading long and short inventory positions in securities for a plurality of participants, comprising:
  allowing each of the participants to enter information via a graphical user interface defining restrictions on trading long and short positions in securities of the participant and information defining substitution parameters for adjusting the long and short positions of the participant;
  allowing each of the participants to upload position file data on net long and net short positions of the participant;
  allowing each of the participants to upload trades file data on repo and reverse repo security transactions of the participant for adjusting the long and short positions of the participant;
  adjusting, by software executed by computer hardware, the long and short positions of each participant based on the substitution parameters and the trades file data of the participant and outputting a position file with first round adjustments for the participant;
  adjusting, by software executed by computer hardware, each participant's long and short positions with first round adjustments based on the security restrictions of the participant and outputting a position file with second round adjustments; and
  utilizing, by software executed by computer hardware, each participant's position file with second round adjustments, identifying, by software executed by computer hardware, short covering and long funding matches for the participant, generating, by software executed by computer hardware, corresponding repo and reverse trades for the participant, and outputting, by software executed by computer hardware, an executed trades file of the participant's trades by a matching engine;
  wherein adjusting each participant's long and short positions based on the security restrictions further comprises, utilizing the participant's position file with first round adjustments and the security restrictions for each short position of the participant available for borrowing, determining adjustments for percentage limitations for the short positions; and
  wherein determining the adjustments for percentage limitations for the short positions further comprises, for each short position of the participant available for borrowing:
  (a) multiplying the short position by a pre-determined percentage allowed to borrow to obtain the adjustment for percentage limitation "p", and
  (b) adjusting the short position to equal the lesser of the adjustment for percentage limitation p and a short quantity from the position file with first round adjustments, wherein it is assumed that the quantities are represented as positive numbers.

24. The method of claim 23, wherein adjusting each participant's long and short positions based on the security restrictions further comprises, utilizing the participant's position file with first round adjustments and the security restrictions, for each participant short position available for borrowing, determining an adjustment for fixed quantity limitations by adjusting the short position available for borrowing to equal the lesser of a fixed quantity established in the security restrictions and a short quantity from the position file with first round adjustments, wherein it is assumed that the quantities are represented as positive numbers.

25. The method of claim 1, wherein identifying the short covering and long funding matches and generating corresponding repo and reverse trades for each participant further comprises, for each security, calculating an aggregate value of the long positions and the short positions for all of the participants, and if aggregate value of the short positions for all of the participants is less than or equal to the aggregate value of the long positions for all of the participants:
  (a) for each short participant, booking a reverse with a trade quantity equal to the participant's short position quantity; and
  (b) for each long participant, booking a repo with a trade quantity equal to long position quantity of the participant multiplied by a short ratio calculated as the aggregate value of the short positions divided by the aggregate value of the long positions for the security.

26. The method of claim 1, further comprising completing a cycle and outputting of matched trade information to each participant daily prior to start of a business day.

27. The method of claim 1, further comprising submitting resultant trade transactions for GSCC.

28. A system for trading long and short inventory positions in securities for a plurality of participants, comprising:
- a data store adapted for receiving information entered by each of the participants via a graphical user interface defining restrictions on trading long and short positions in securities of the participant and information defining substitution parameters for adjusting the long and short positions of the participant;
- the data store being further adapted to receive via an interface an upload of position file data on net long and net short positions of each participant and an upload of trades file data on repo and reverse repo security transactions of each participant for adjusting the long and short positions of the participant;
- a server coupled to the data store and pre-programmed for adjusting the long and short positions of each participant based on the substitution parameters and the trades file data of the participant and outputting a position file with first round adjustments for the participant;
- the server being further pre-programmed for adjusting each participant's long and short positions with first round adjustments based on the security restrictions of the participant and outputting a position file with second round adjustments; and
- a matching engine pre-programmed for, utilizing each participant's position file with second round adjustments, identifying short covering and long funding matches for the participant, generating corresponding repo and reverse trades for the participant, and outputting an executed trades file of the participant's trades.

29. A method of trading long and short inventory positions in securities for a plurality of participants, comprising:
- allowing each participant to submit position data on long and short positions of the participant; and
- utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant.

30. The method of claim 29, further comprising allowing each of the participants to enter information via a graphical user interface defining restrictions on the trading long and short positions in securities of the participant and information defining substitution parameters for adjusting the long and short positions of the participant.

31. The method of claim 29, further comprising allowing each of the participants to upload trades file data on repo and reverse repo security transactions of the participant for adjusting the long and short positions of the participant.

32. The method of claim 29, further comprising adjusting the long and short positions of each participant based on substitution parameters and trades file data of the participant.

33. The method of claim 29, further comprising adjusting each participant's long and short positions based on security restrictions of the participant.

34. The method of claim 29, further comprising utilizing each participant's position file, identifying short covering and long funding matches for the participant and generating corresponding repo and reverse trades for the participant.

35. The method of claim 29, further comprising allowing each of the participants to enter information establishing filters for at least one of restricting and excluding predetermined long and short positions in the securities of the participant.

36. The method of claim 29, further comprising allowing each of the participants to enter information for establishing a list of securities for lending and borrowing for the participant.

37. The method of claim 29, further comprising allowing each of the participants to enter information for establishing one of a lending and borrowing limit on an individual security basis for the participant.

38. The method of claim 29, further comprising allowing each of the participants to enter information for defining restrictions on trading counterparties for the participant.

39. The method of claim 29, further comprising adjusting each long position of the participant available for lending for each participant based on the substitution parameters and trades file data of the participant.

40. The method of claim 29, further comprising, for each long position of the participant available for lending, determining adjustments for day-to-day reverses and reverses with rights of substitution.

41. A method of trading long and short inventory positions in securities for a plurality of participants, comprising:
- allowing each participant to submit position data on long and short positions of the participant; and
- utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and
- for each long position of the participant available for lending, determining, by software executed by computer hardware, adjustments for day-to-day reverses and reverses with rights of substitution; and
- determining, by software executed by computer hardware, the adjustment for day-to-day reverses for each long position of the participant available for lending according to the following formula:
  - (a) calculating a sum "t" of day-to day-reverses,
  - (b) obtaining a pre-defined percentage value factor "u" from the substitution parameters for an asset class and transaction type for the long position available for lending, and
  - (c) multiplying the sum t by the factor u to obtain the adjustment for day-to-day reverses "w."

42. A method of trading long and short inventory positions in securities for a plurality of participants, comprising:
- allowing each participant to submit position data on long and short positions of the participant;
- utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and
- determining, by software executed by computer hardware, an adjustment for reverses with rights of substitution for each long position of the participant available for lending according to the following formula:
  - (a) calculating a sum "x" of the reverses,
  - (b) obtaining a pre-defined percentage value factor "y" from the substitution parameters for the asset class and transaction type combination for the long position available for lending, and
  - (c) multiplying the sum x by the factor y to obtain the adjustment for reverses with rights of substitution "z."

43. The method of claim 42, wherein adjusting the long and short positions for each participant based on the substitution parameters and trades file data of the participant further comprises adjusting the amount available for lending to be the greater of zero and an original long position of the participant minus the adjustment for day-to-day reverses w minus the adjustment for reverses with rights of substitution z.

44. The method of claim 29, further comprising adjusting each short position of the participant available for borrowing based on the substitution parameters and trades file data of the participant.

45. The method of claim 29, further comprising, for each short position of the participant available for borrowing, determining adjustments for day-to-day repos, and for each short position of the participant available for lending, determining adjustments for repos with rights of substitution.

46. A method of trading long and short inventory positions in securities for a plurality of participants, comprising:
  allowing each participant to submit position data on long and short positions of the participant;
  utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and
  for each short position of the participant available for borrowing, determining, by software executed by computer hardware, adjustments for day-to-day repos, and for each short position of the participant available for lending, determining adjustments for repos with rights of substitution;
  wherein determining the adjustment for day-to-day repos further comprises, for each short position of the participant available for borrowing:
    (a) calculating a sum "e" of the day-to-day repos,
    (b) obtaining a pre-defined percentage value factor "f" from the substitution parameters for an applicable asset class and transaction type for the short position available for borrowing, and
    (c) multiplying the sum e by the a factor f to obtain the adjustment for day-to-day repos "g."

47. The method of claim 46, wherein determining the adjustment for repos with rights of substitution further comprises, for each short position of the participant available for lending:
  (a) calculating a sum "j" of repos,
  (b) obtaining a pre-defined percentage value factor "k" from the substitution parameters file for an asset class and transaction type for the short term position available for lending, and
  (c) multiplying the sum j by the factor k to obtain the adjustment for repos with right of substitution "m."

48. The method of claim 47, wherein adjusting the long and short positions for each participant based on the substitution parameters and trades file data of the participant further comprises adjusting the amount available for borrowing to be the greater of zero and an original short position of the participant minus the adjustment for day-to-day repos g minus the adjustment for repos with right of substitution m, wherein it is assumed that the quantities are represented as positive numbers.

49. The method of claim 29, further comprising, utilizing position file and the security restrictions of the participant, adjusting each long position of the participant available for lending.

50. The method of claim 29, further comprising, utilizing the participant's position data and security restrictions for each long position of the participant available for lending, determining adjustments for percentage limitations for the long positions.

51. A method of trading long and short inventory positions in securities for a plurality of participants, comprising:
  allowing each participant to submit position data on long and short positions of the participant;
  utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and
  utilizing, by software executed by computer hardware, the participant's position data and security restrictions for each long position of the participant available for lending, determining, by software executed by computer hardware, adjustments for percentage limitations for the long positions;
  wherein determining the adjustments for percentage limitations for the long positions further comprises, for each long position of the participant available for lending:
    (a) multiplying the long position by the percentage allowed to lend to obtain the adjustment for percentage limitation "n," and
    (b) adjusting the long position to equal the lesser of the adjustment for percentage limitation n and a long quantity from the position file with first round adjustments.

52. The method of claim 51, wherein adjusting each participant's long and short positions based on the security restrictions further comprises, utilizing the participant's position file with first round adjustments and the security restrictions, for each participant long position available for lending, determining an adjustment for fixed quantity limitations by adjusting the long position available for lending to equal the lesser of a fixed quantity established in the security restrictions and a long quantity from the position file with first round adjustments.

53. A method of trading long and short inventory positions in securities for a plurality of participants, comprising:
  allowing each participant to submit position data on long and short positions of the participant;
  utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and
  for each security, calculating, by software executed by computer hardware, an aggregate value of a the long positions and the short positions for all of the participants, and if the aggregate value of the short positions for all of the participants is greater than the aggregate value of the long positions for all of the participants:
    (a) for each long participant, booking by software executed by computer hardware, a repo with a trade quantity equal to a long position quantity of the participant; and
    (b) for each short participant, booking, by software executed by computer hardware, a reverse with a trade quantity equal to a short position quantity of the participant multiplied by a long ratio calculated as the aggregate value of the long positions divided by the aggregate value of the short positions for the security.

54. The method of claim 29, further comprising, utilizing a position file and security restrictions of each participant to adjust each short position of the participant available for borrowing.

55. The method of claim 29, further comprising, utilizing a position file and the security restrictions for each short position of each participant available for borrowing, determining adjustments for percentage limitations for the short positions of the participant.

56. A method of trading long and short inventory positions in securities for a plurality of participants, comprising:

allowing each participant to submit position data on long and short positions of the participant;

utilizing, by software executed by computer hardware, each participant's position data, running, by software executed by computer hardware, a batch process to identifying short covering and long funding matches for the participant and generating, by software executed by computer hardware, corresponding repo and reverse repo trades for the participant; and utilizing, by software executed by computer hardware, a position file and the security restrictions for each short position of each participant available for borrowing, determining, by software executed by computer hardware, adjustments for percentage limitations for the short positions of the participant;

wherein determining the adjustments for percentage limitations for the short positions further comprises, for each short position of the participant available for borrowing:

(a) multiplying, by software executed by computer hardware, the short position by a pre-determined percentage allowed to borrow to obtain the adjustment for percentage limitation "p", and (b) adjusting, by software executed by computer hardware, the short position to equal the lesser of the adjustment for percentage limitation p and a short quantity from the position file with first round adjustments, wherein it is assumed that the quantities are represented as positive numbers.

57. The method of claim 29, further comprising, utilizing a position file and security restrictions of each participant, for each participant short position available for borrowing, determining an adjustment for fixed quantity limitations by adjusting the short position available for borrowing to equal the lesser of a fixed quantity established in the security restrictions and a short quantity from the position file with first round adjustments, wherein it is assumed that the quantities are represented as positive numbers.

58. The method of 29, further comprising, for each security, calculating an aggregate value of the long positions and the short positions for all of the participants, and if aggregate value of the short positions for all of the participants is less than or equal to the aggregate value of the long positions for all of the participants:

(a) for each short participant, booking a reverse with a trade quantity equal to the participant's short position quantity; and (b) for each long participant, booking a repo with a trade quantity equal to long position quantity of the participant multiplied by a short ratio calculated as the aggregate value of the short positions divided by the aggregate value of the long positions for the security.

59. The method of claim 29, further comprising completing a cycle and outputting of matched trade information to each participant daily prior to start of a business day.

60. The method of claim 29, further comprising submitting resultant trade transactions for GSCC.

* * * * *

UNITED STATES PATENT AND TRADEMARK OFFICE
CERTIFICATE OF CORRECTION

PATENT NO. : 7,660,762 B1 Page 1 of 1
APPLICATION NO. : 11/520691
DATED : February 9, 2010
INVENTOR(S) : Thomas K. Mellina It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Twenty-eighth Day of December, 2010

David J. Kappos
*Director of the United States Patent and Trademark Office*